United States Patent [19]

Berger

[11] Patent Number: 5,798,517
[45] Date of Patent: Aug. 25, 1998

[54] SUN TRACKER SYSTEM FOR A SOLAR ASSEMBLY

[76] Inventor: Alexander Berger, Konigsbergerstrasse 196, D-7500 Karlsruhe 1, Germany

[21] Appl. No.: 792,785

[22] Filed: Feb. 3, 1997

Related U.S. Application Data

[62] Division of Ser. No. 244,125, May 19, 1994, Pat. No. 5,600,124.

[51] Int. Cl.[6] .................................................. G01J 1/20
[52] U.S. Cl. ............................. 250/203.4; 250/203.1; 126/573; 126/576
[58] Field of Search .......................... 250/203.3, 203.4, 250/203.1; 126/573, 576, 577, 578

[56] References Cited

U.S. PATENT DOCUMENTS

| 4,187,831 | 2/1980 | Eubank . |
| 4,328,789 | 5/1982 | Nelson . |
| 4,361,758 | 11/1982 | Rotolo . |
| 4,519,382 | 5/1985 | Gerwin . |
| 5,253,637 | 10/1993 | Maiden . |
| 5,600,124 | 2/1997 | Berger .................................. 250/203.4 |

FOREIGN PATENT DOCUMENTS

| 0 164 066 | 6/1985 | European Pat. Off. . |
| 2 440 526 | 5/1980 | France . |
| 2 527 750 | 12/1983 | France . |
| 27 15 334 | 10/1978 | Germany . |
| 34 21 411 | 7/1985 | Germany . |
| 60-38472 | 8/1986 | Japan . |
| 61-195244 | 8/1986 | Japan . |

*Primary Examiner*—Stephone B. Allen
*Attorney, Agent, or Firm*—Baker & Daniels

[57] ABSTRACT

The known sun tracker system with helical groove guide that works according to the gravity force principle is not operational without the daily intervention of an operator, limits the weight of the solar collectors, given the muscular strength required, and thirdly makes the tracking speed dependent from the ambient temperatures, because of the temperature-dependent viscosity of the driving liquid. The disclosed tracker system has a vertical pipe, a sleeve provided with a helical groove, a guiding element, a power block that carries most of the weight of the solar assembly and rotary mast, a hydraulic energy accumulator linked by a control valve to a regulating cylinder, so that the system can be operated several days independently of outer energy sources, and a thermo-throttle that allows the rotary mast to turn at a tracking speed independent from the ambient temperature. This sun tracker system is very robust, has a relatively low energy consumption even in heavy solar assemblies and is very suitable for large-scale applications.

21 Claims, 9 Drawing Sheets

SUN TRACKER SYSTEM FOR A SOLAR ASSEMBLY

This is a division of application Ser. No. 08/244,125, filed May 19, 1994, now U.S. Pat. No. 5,600,124.

BACKGROUND OF THE INVENTION

1. Field of the Invention

The present invention relates to sun trackers.

2. Description of the Related Art

The tracker working according to the gravitational force principle is known (see DE-3421411 Cl). It serves for tracking the sun movement with the sun collectors, thus increasing a solar facility's efficiency.

In this system, the solar collectors are carried by a rotary pole, supported by a chamber of variable volume. The fluid contained in the chamber is displaced from the chamber by the dead load force of the sun collectors and of the rotary pole, penetrating through a nozzle in this process. The rotary pole thus sinks and is rotated about its vertical axis through the interaction of a bolt with a helical groove guide, tracking the sun movement from east to west. The return to the initial position "to the east" is performed every morning at sunrise by lifting the rotary pole with muscle power; tracking along the horizontal axis, according to the elevation angle is not performed in case of such tracker system.

In spite of the robust construction, this tracker has proved to be not without problems as far as the technical application is concerned.

For one, this tracker does not work without the daily intervention of an operator, lifting the rotary pole and thus positioning the sun collectors in their initial position.

Secondly, the sun collectors' weight is limited because of the required human muscle power.

Thirdly, the varying ambient temperature causes, based on the temperature dependent viscosity of the fluid in the chamber, deficiencies as regards the tracking speed which can lead to considerable failures in case of larger temperature differences, for example in summer/winter cycles and can thus under certain circumstances make the system useless.

For the above reasons, this construction proves hardly suitable and/or unsuitable for application in such solar assemblies as solar-thermal collectors, storage collectors, sunlight concentrators, flat mirrors for solar towers but also in photovoltaic modules with amplification mirrors.

SUMMARY OF THE INVENTION

The task that the present invention is based on consists of eliminating the above problems.

This task is in principle solved by this tracker system being extended by a pressure energy accumulator, a power block and a thermothrottle as well as by an appliance for rotating the solar assembly about its horizontal axis.

Developments, improvements, special execution types are subject of the sub-claims.

The invention is subsequently explained in more detail by means of the drawings.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5b is a view of the solar elements of the light detector of FIG. 5a.

FIG. 6b is a view of the solar elements of the light detector of FIG. 6a.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments chosen and described so that others skilled in the art may utilize their teachings.

Figures 1A, 1B:
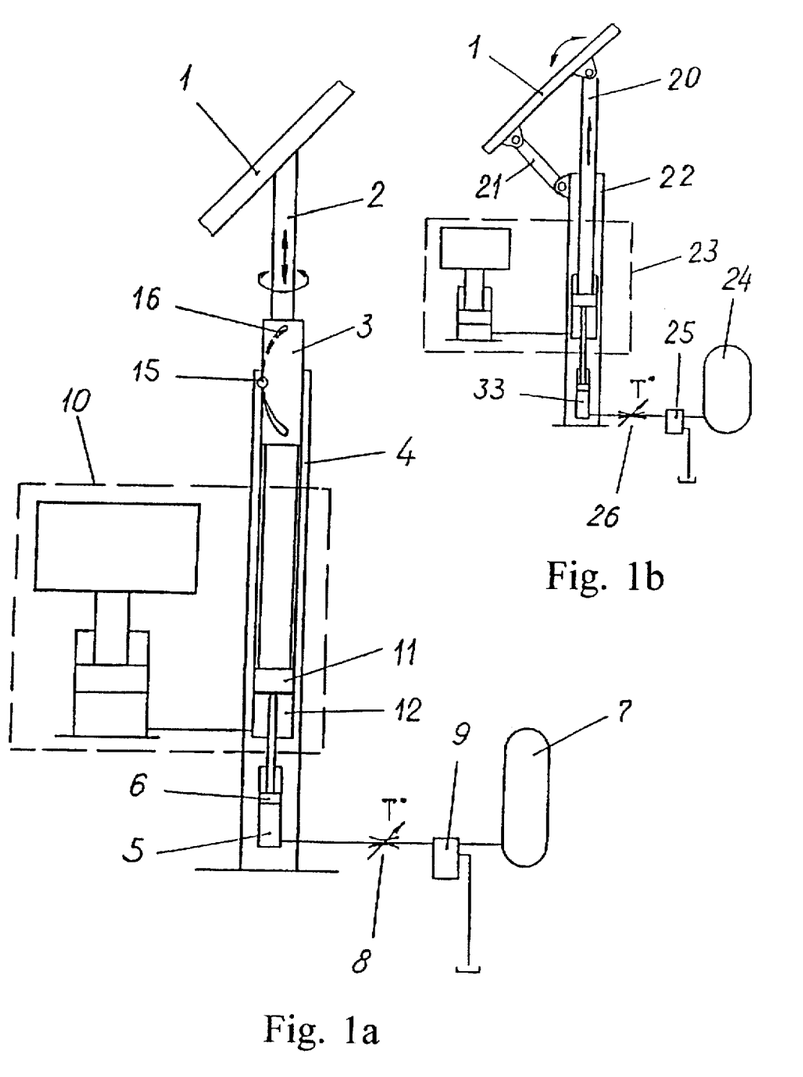
FIG. 1a is a schematic diagram of the azimuth sun tracker working according to the gravitational force principle with power block, pressure energy accumulator and thermothrottle.
FIG. 1b is a schematic diagram of the elevation sun tracker working according to the gravitational force principle with power block, pressure energy accumulator and thermothrottle.

FIG. 1a shows a solar assembly (1), rigidly mounted on a rotary pole (2). This rotary pole (2) contains a bearing (3), through which the rotary pole is guided together with a ring (11) in a stationary guide tube (4). The ring (11) interacts with a chamber of variable volume (5), and/or with an regulating cylinder, the lifting or lowering of the rotary pole (2) with the solar assembly (1) is thus initiated by a change of volume in the chamber (5). The bearing (3) is equipped with a helical guideway, causing the rotary pole to rotate about the vertical axis during the lifting or lowering of the rotary pole (2). The tracker in accordance with FIG. 1a also comprises a power block (10), a pressure energy accumulator (7) and a thermothrottle (8), but a tracker which is does not comprise all the components is also practical.

The power block (10) is to carry the main part of the weight of the solar assembly (1) and of the rotary pole (2), the potential energy reduced during the lowering of the solar assembly and the rotary pole is thus not converted into frictional heat at the (outlet) nozzle, but stored by using the power block (10) and subsequently used for lifting the rotary pole (2) with the solar assembly (1). The regulating cylinder (5) which serves as actuator must in this case to surmount hardly more than the frictional force and vis inertiae in the system. The constructional execution of the power block (10) can be realized through a counterweight (see FIG. 1a/FIG. 1b). The counterweight is coupled through a fluid transmission with the rotary pole in the manner of a hydraulic balance (see FIG. 1a/FIG. 1b). Alternatively, the counterweight may be coupled through a mechanic power transmission with the rotary pole in the manner of a mechanical balance. In another alternative embodiment, the power block may be realized through a pressure accumulator of conventional construction type, coupled with the rotary pole through a fluid transmission and not or insignificantly altering the pressure values during the work cycle, or may be realized through a long stroke spring.

With integrated power block (10), the tracker is also suitable for heavy solar assemblies, with the auxiliary service of the tracker remaining low as far as driving energy is concerned.

The pressure energy accumulator (7) is connected to the regulating cylinder (5) via control valve (9) and permits tracker operation independent from external energy sources for several days and/or weeks or months, depending on the pressure energy accumulator's (7) capacity. The pressure energy accumulator (7) can be recharged at any time, also in "small portions", favoring feeding from regenerative energy sources.

If a Sterling engine is for example used for pump drive, it is useful, especially in case of photovoltaic solar assemblies, to gain the thermal energy for the Stirling engine by cooling the solar elements. A heat exchanger brought in contact with solar modules offers a double gain, for one, the drive power for the tracker is available free of charge and secondly the efficiency of the photovoltaic solar elements is increased by cooling.

The further development consists of using the heat exchanger surface as carrier for solar elements. The solar elements (e.g. ball silicon) are in this case applied directly on the heat exchanger surface during the production process.

Recharging the pressure energy accumulator (7) is also possible with muscle power by using a single plunger pump, as in the case of the hydraulic car jack.

The further charging appliances and execution types for the pressure energy accumulator include having the pump used for recharging the pressure energy accumulator being realized as a single plunger pump, which is a piston cylinder (with power transmission) equipped with check valves and connected with the heat exchanger, with the piston of the piston cylinder being driven through the temperature changes in the day-night-cycle and/or in the course of the day. A line with check valve exists between an outlet space for the fluid and the storage space of the pressure energy accumulator. The weight case is equipped with a lifting appliance in the manner of a car jack, leading to a partial vacuum in the storage space of the pressure accumulator during the lifting of the weight case, the fluid thus being sucked into the storage space. All trackers are fed by a common pressure energy accumulator in case of several trackers installed in a field.

The thermothrottle (8) (description see below in FIG. 4) is used for keeping constant at different temperatures a resulting resisting force, counteracting the rotary pole (2) and the solar assembly (1) on the part of the other system components, thus achieving a predetermined movement speed of the rotary pole (2) and the solar assembly (1) independent from the ambient temperatures.

In FIG. 1b: If a suspension pole (20) is used instead of the rotary pole (2), with the bearing (3) with helical groove guide in accordance with FIG. 1a not being installed in this case and the solar assembly (1) being connected with a supporting construction (22) through a cross-bar (21) with two turning knuckles and connected with a suspension pole (20) through a turning knuckle, an appliance is achieved for rotating the solar assembly about the horizontal axis (elevation tracker). Otherwise all interpretations made in connection with FIG. 1a are also, without restrictions, valid for the elements displayed in FIG. 1b. When lifting or lowering the suspension pole (20), the solar assembly (1) is rotated about the solar assembly's coupling with the suspension pole by the effect of the laterally installed cross-bar (21), which leads to a change of the solar assembly's (1) elevation angle in relation to the horizon. The solar assembly's point of gravity is in this case located best between the coupling of the solar assembly (1) with the cross-bar (21) on the one hand and with the suspension pole (20) on the other hand.

The elevation tracking can also be achieved by using a piston cylinder instead of the cross-bar (21) (see FIG. 1b) and fastening the suspension pole (20) rigidly in this case, with the realization of the piston cylinder drive being possible with the same components as the drive of the suspension pole (20).

Figures 2, 2A:
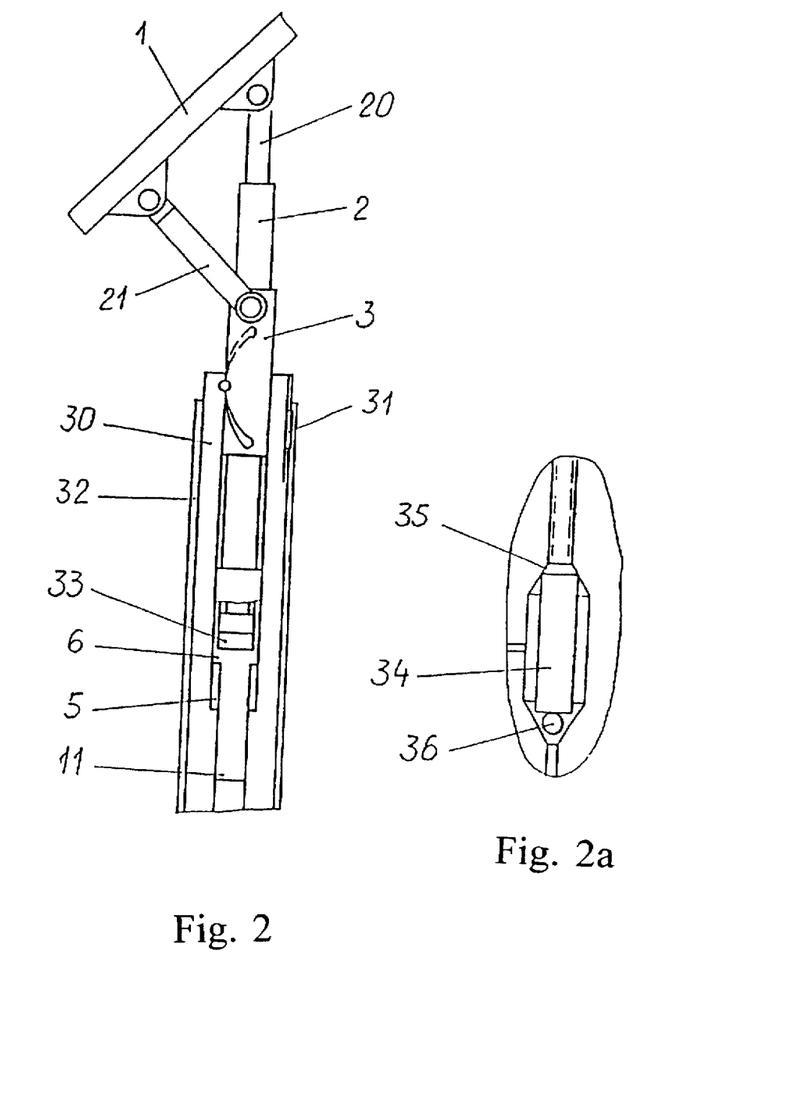
FIG. 2 is a view of the constructive shape of the biaxial sun tracker working according to the gravitational force principle with power block, pressure energy accumulator and thermothrottle.
FIG. 2a is an enlarged view of the steering rod of the biaxial sun tracker of FIG. 2.

FIG. 2 shows a biaxial sun tracker working according to the gravitational force principle matching the synergetic combination in accordance with the schematic diagrams FIG. 1a and FIG. 1b, with helical groove guide and integrated power block as well as with a pressure energy accumulator and a thermothrottle. The guide tube (see (4) in accordance with FIG. 1a) is of solid construction (so called weight case (30)) and serves as weight and as piston of a pressure energy accumulator, as case of the regulating cylinder (5) for the rotary pole (2) and as counterweight of the power block and it is secured against torsion in relation to the vertical cylindrical pipe (32) by form-fitting guidance (31). The piston of the regulating cylinder for the rotary pole (6) and the servo piston (11) of the power block are performed as one construction unit in form of a T-piston (11/6), with the lower part of the T-piston (servo piston (11)) constantly being subject to the pressure of the pressure energy accumulator. A rotational translatory bearing with guidance (description see FIG. 3 below) is integrated into the weight case (30), with the interior sleeve (3) of this bearing being fastened to the rotary pole (2). The solar assembly (1) is coupled with this interior sleeve (3) through the cross-bar (21). The solar assembly (1) is also connected through a turning knuckle with the suspension pole (20) which is located axially in the rotary pole (2) and is driven there by a different regulating cylinder (33). A steering rod (34) with short stroke is installed in the longitudinal drilling in the case of the respective regulating cylinder, pressing in its lower final position onto a ball (36), which interrupts the connection between the pressure energy accumulator and the regulating cylinder and in its top final position blocks the connection with the outlet by bevel seat (35) (compare control valve in accordance with FIG. 1). The thermothrottle is integrated into this steering rod. The steering rod is switched by automatic switching when reaching the final positions of the solar assembly or by a solenoid controlled by a clock relay or also by manual operation.

Further developments involve fluid pressure medium, wherein the function of the tank for the fluid is realized through the free spaces in the weight case (30). In rotating the solar assembly about the horizontal axis, the control of the rotating speed may be performed by shifting the solar assembly's point of gravity in relation to the horizontal axis of rotation and that is by shifting an additional weight which is coupled with the solar assembly.

Figure 3A:
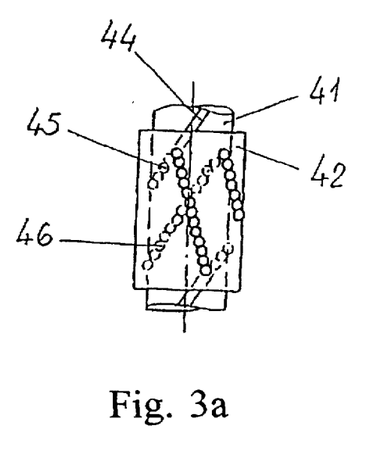
FIG. 3a is a view of a rotational-translatory radial bearing with guidance.
Figure 3B:
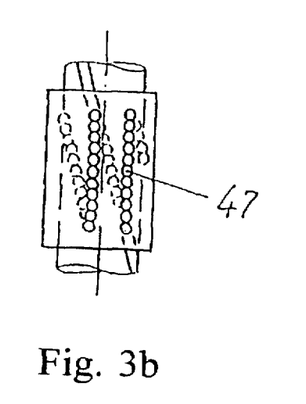
FIG. 3b is a view of a rotational-translatory radial bearing with guidance.

FIG. 3 shows two examples of execution of a rotational translatory bearing with guidance (especially for application with the helical guideway of the rotary pole (2) in accordance with FIG. 2.

This construction unit is achieved by transforming a known "linear guidance" (with balls) into a "helical guidance" (also with balls) and that is by replacing the linear ball races on the inner surface of the exterior sleeve of the linear guidance by helical ball races and by connecting the ball races on the exterior surface of the exterior sleeve (42) (see FIG. 3a) with each other. A closed spiral line is thus achieved, presenting an infinite ball race for the bearing balls (46). The helical guidance is in this case realized by helical guide grooves (44) on the interior sleeve (41) and complementary guide grooves on the exterior sleeve (42). For this, a spiral line with guide balls (45) is formed offset from the spiral line with bearing balls (46). The tangents of the helical bearing ball races and the guide ball races are always parallel to each other.

As another variant, all ball races, for guide balls as well as for bearing balls are connected to one single closed spiral line (47) (see FIG. 3b), with each ball, depending on its actual position, fulfilling the function of either bearing ball or guide ball. The further developments of the bearing with guidance, especially for use for the tracker with rotary pole in allocated to the ball races, are similar to the balls of known radial ball bearings take the radial loads. The helical guidance is constructed similar to that of ball nuts, by both sleeves each containing at least one helical guide groove, each containing at least one guide ball taking the tangential loads. The interior sleeve does not contain ball races for bearing balls, thus the bearing balls roll on the surface of the interior sleeve. A slide bearing may be used instead of the ball bearing. All guide grooves of the exterior sleeve may be connected by ducts in the exterior cylinder to form a closed spiral line and thus form an infinite ball race for the guide balls. All ball races of the exterior sleeve may also be connected by ducts in the exterior sleeve to form a closed spiral line and forming an infinite ball race for the bearing balls (see FIG. 3a). The display of the tracker in FIG. 2 contains the bearing with only one guide ball per ball race, wherein the guide ball is inserted through the radial drilling in the exterior sleeve and is kept in working position by the bush containing a slide surface for the ball.

FIG. 4a to 4d respectively show a passive thermothrottle. It consists of a throttle case (51), a core body (52) and positioning and/or fastening elements (53), (54), (55) for the core body. In accordance with FIG. 4c, the positioning and/or fastening elements are performed as radial spacer pins (54), inserted in deep radial drillings in the core body (52). One of the spacer pins serves as holding pin (55) for the axial fixation. The fixation of the core body can also be realized by form-fitting (53) at the end of the core body (see FIG. 4a, 4b, 4d). The core body (52) is installed in the throttle case (51), with the coefficients of thermal expansion of the throttle case (51) and those of the core body (52) differing considerably from each other and leading to a continuous change of the geometry of the flow cross section when the fluid and/or throttle temperature changes, the continuous change of the flow resistance of the thermothrottle in accordance with a predetermined regularity determined by the material selection and component geometry thus being achieved. The most simple way to realize the throttling flow cross section of the thermothrottle is by the shape of the throttle case (51) and the shape of the core body (52) through a conical gap (see FIG. 4b), a cylindrical gap (see FIG. 4c) or a nozzle-baffle plate-system (see FIG. 4a); the core body (52) is flown against axially in this case. The variant with the core body (see FIG. 4d) mounted laterally and transversely in relation to the oncoming flow works similar to a cross slide.

In another development of the above described thermothrottle (see FIG. 4e), the core body (59), having in this case a large coefficient of thermal expansion than the throttle case (51) is equipped with an internal heating element (56), e.g. immersion heater or heating coil, which through heat that is set free leads to an expansion of the core body (59) and thus to an increased throttle resistance. The part of the core body that is surrounded by the flow is wrapped in an electrical heating sleeve (57), which causes a temperature increase in the adjoining flow border layer and thus a decrease of the flow border layer thickness and if the throttle resistance, with the heating sleeve (57) and the core body (59) being isolated from each other by a thermally insulating elastic layer (58).

Figure 4A:
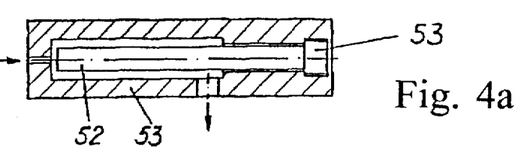
FIG. 4a is a view of a passive thermothrottle with a nozzle-baffle plate system.
Figure 4B:
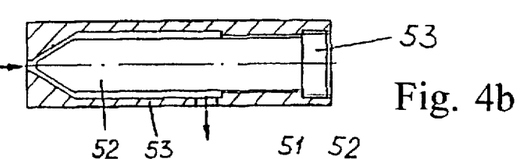
FIG. 4b is a view of a passive thermothrottle with a conical gap.
Figure 4C:
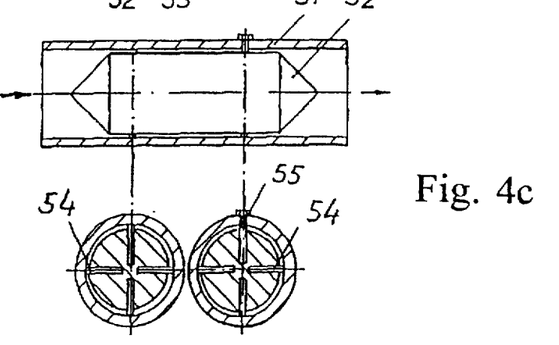
FIG. 4c is a view of a passive thermothrottle with a cylindrical gap.
Figure 4D:
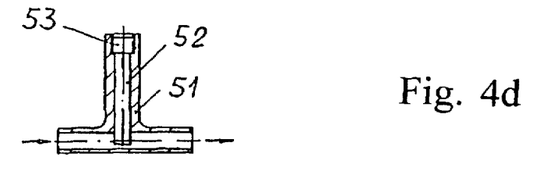
FIG. 4d is a view of a passive thermothrottle with a transversely disposed core body.
Figure 4E:
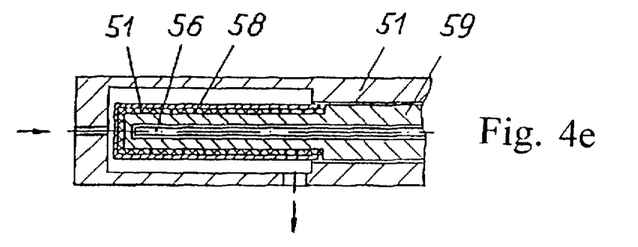
FIG. 4e is a view of an active thermothrottle with an active heating element.

This active thermothrottle displayed in FIG. 4e can be controlled with detectors. When using light detectors adjusted to the performance output signal, these are connected directly with the active thermothrottle without intermediate amplification.

It is also possible to control the tracker by a control program or with a permanently adjusted light detector for continuous sun position recording (more detailed description see below). Incremental sensors in the control circuit are required for these cases.

The control signal can also be gained through a temperature sensor, with the deviation of the ambient and/or fluid temperature being measured in relation to a reference temperature and used as control signal after processing.

A proportional valve can also be used instead of the active thermothrottle.

Figure 5A:
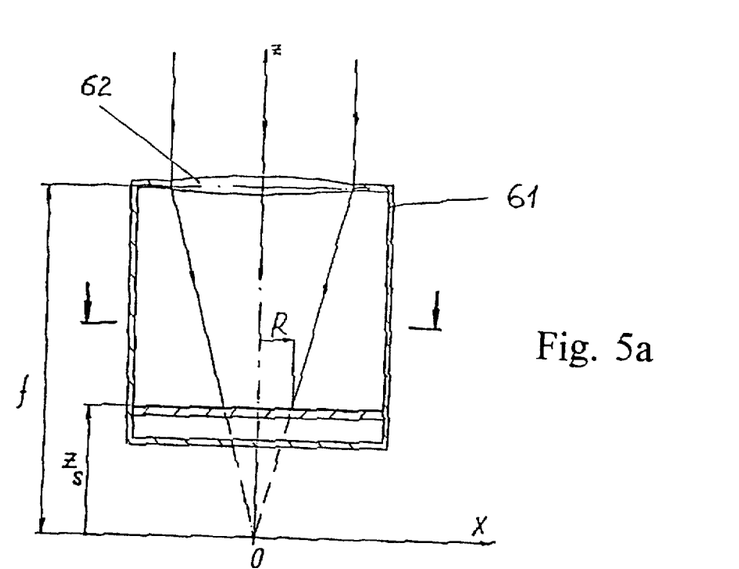
FIG. 5a is a view of a light detector.
Figure 5B:
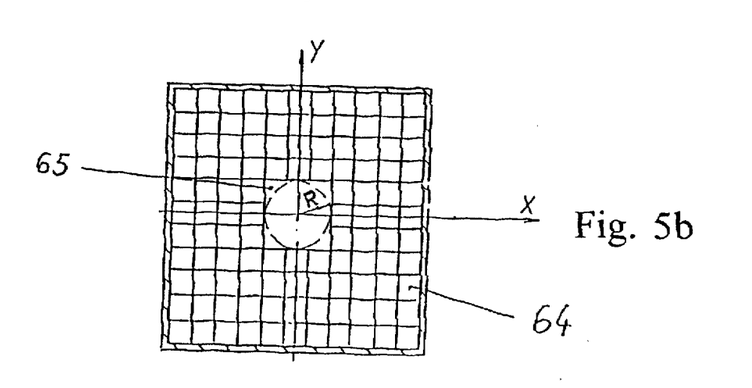
Figure 6A:
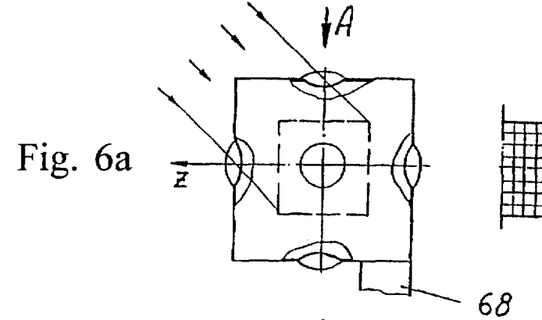
FIG. 6a is a view of a second embodiment of a light detector with unlimited angle of function.
Figure 6B:
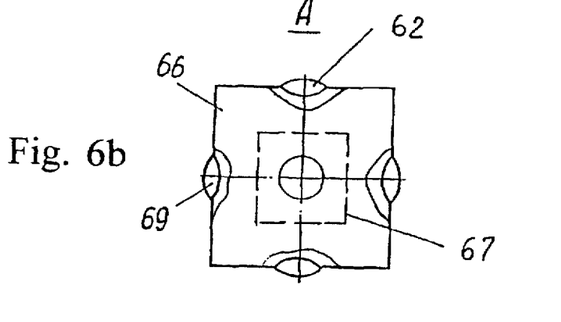
Figure 6C:
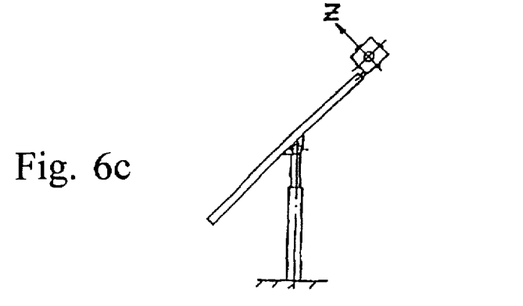
FIG. 6c is a view of FIG. 6a without the light ray.
Figure 6D:
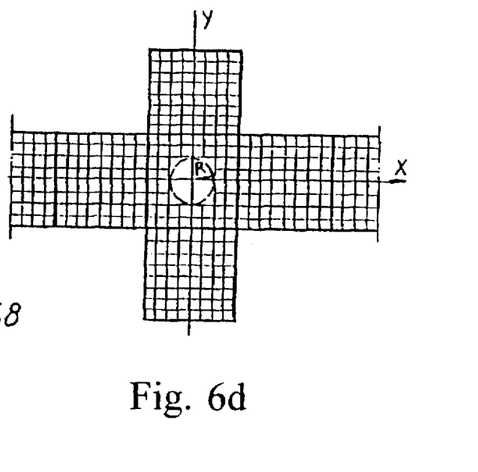
FIG. 6d is a view of the light sensor mounted on the solar assembly.

FIG. 5 and FIG. 6 show different execution types of light detectors for trackers with active control.

In case of the light detector in accordance with FIG. 5, a focusing lens (62) is installed in the top wall of the case (61) and solar elements (64) are positioned in the level $z_s$ ($z_s<f$, with f being the focal distance of the lens (63)) in such way, that an area free from solar elements is achieved in the center (65), so that none of the solar elements is covered by the light spot with the tracker in the desired position (i.e. the solar rays are parallel with the z-axis). Solar elements are in this case such elements, that transfer the insolated energy of the solar spectrum into a different type of energy, e.g. electrical energy or pressure energy, to be suitable for use as signal. The solar elements with the coordinates |x|−R>0 (with R=radius of the light spot in the desired position) deliver under the influence of the solar rays the control signal for the actuator of the tracker's first axis of rotation and the solar Elements with the coordinates |y|−R>0 for the actuator of the tracker's second axis of rotation. The solar elements with the coordinates (|x|−R>0, |y|−R>0) thus deliver control signals for the actuators of both axes of rotation, with solar elements with increasing efficiency being selected with increasing distance from point x=y=0.

FIG. 6 demonstrates a different development of the light detector described under FIG. 5. In this case, the light detector's radius of action has been increased to ±180° for each axis of rotation. In this case each side of the centrosymmetrical case (66) with the number of sides being n≧6, in the most simple case a cuboid (66), is equipped with a lens (69) at its center. A solar element carrier (67), having a shape similar to that of the case (66) is adjusted centrally in the case (66), with each side of the solar element carrier (67) being covered with solar elements and only one side having in its center an area free from solar elements (this is equal to the desired position of the tracker) (see developed view of solar element carrier FIG. 6b). The geometrical relations have been chosen in such way that the light spot is on one of the sides of the solar element carrier in any arbitrary position of the light detector (apart from the desired position). The sensor is fastened with a fastening appliance (68) in the top part of the solar assembly (see FIG. 6d).

Another variant of the light detector in accordance with FIG. 6 is especially for continuous determination of the sun position and for active control of a sun tracker. The light detector is aligned stationary in the space, with all sides of the solar element carrier, with the exception of the bottom and the north side, being covered homogeneously with solar elements. The solar element field of the light detector is coupled with the sun-orbit coordinate through the evaluation electronics and the actual sun coordinates are determined from the geometrical mean of the illuminated solar element group.

Figure 7:
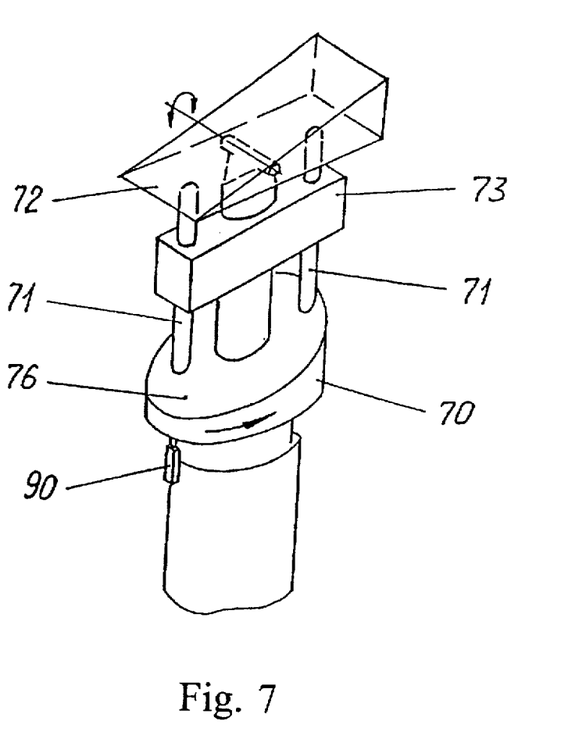
FIG. 7 is a view of an appliance with parallel bars for rotating the solar assembly about its horizontal axis by use of a sloped disk.
Figure 8A:
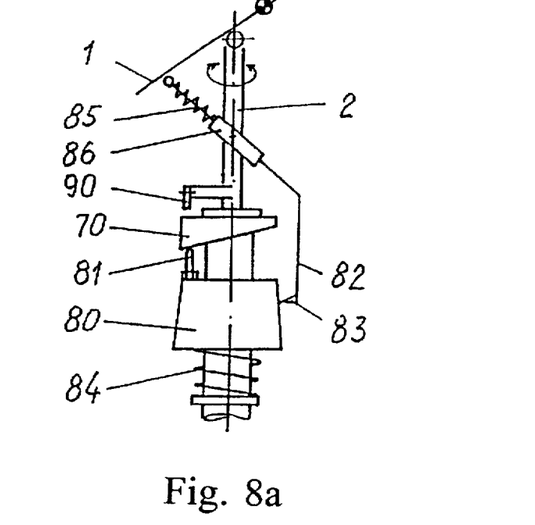
FIG. 8a is a view of an appliance with a profile sleeve for rotating the solar assembly about its horizontal axis by use of a sloped disk.
Figure 8B:
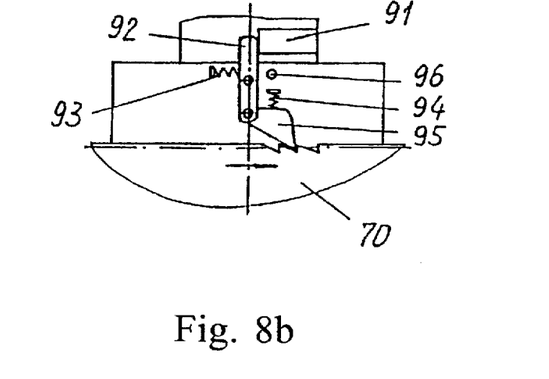
FIG. 8b is a view of an appliance with a profile sleeve for rotating the solar assembly about its horizontal axis by use of a sloped disk.

FIGS. 7 and 8 show the execution examples, how the rotation of the solar assembly around a horizontal axis can be realized with a sloped disk (70) (with one sloped side (76)), kinematically connected with a solar assembly. The sloped disk (70) is in this case rotated about the axis vertical to the axis of rotation of the solar assembly.

The following variants are planned for the kinematic connection of the sloped disk with the solar assembly:

two bars (71) installed parallel-symmetrical in relation to the vertical axis of the tracker (see FIG. 7), with the bars being held either by linear guidances (73) and supporting themselves on the sloped disk and a supporting plate (72) of the solar assembly in doing so or (without figure) connected by single-axis turning knuckles with the supporting plate of the solar assembly and connected through multi-axial turning knuckles with a plate close on the sloped surface of the sloped disk.

two balls (without figure), symmetrical in relation to the horizontal axis of rotation of the solar assembly and integrated in a hinged beam, which is permanently connected with the supporting plate of the solar assembly, rolling on the sloped surface when the sloped disk rotates. The sloped disk together with the balls, integrated in the hinged beam as described above, form a construction unit (axial hinged bearing), transforming the rotating movement, e.g. of a shaft into the swivelling movement, with the swivelling axis positioned vertically in relation to the axis of rotation.

Another development for the above described variants is the use of two sloped disks lying above each other and coupled with each other through spacers. In this case one of the sloped disks performs one rotation per day, determining the slope angle of the solar assembly in the course of the day; the other sloped disk performs one rotation per year, thus taking into consideration the alteration of the day mean values for the slope angle of the solar assembly in the course of the year.

variants with profile sleeve (80) (see FIG. 8a) involve an appliance wherein the solar assembly supports itself with the operating bolt (83) carried by the bar (82) on the profiled exterior surface of the profile sleeve (80) with push freedom. The bolt is supported from below by a pressure spring (84), with the profile sleeve (80) carrying a spacing appliance (81) at the top, which keeps the distance between the profile sleeve (80) and the contact point of the spacing appliance with the sloped surface of the sloped disk (70) constant. The movement axes of the profile sleeve and the sloped disk sighting (see FIG. 8a). The bar (82) is connected with the solar assembly (1) through a turning knuckle and slides in the linear guidance (86) which is hinged swivelling on the rotary pole (2). Pressure spring (85) exists between this turning knuckle and the linear guidance (86). This results in that the solar assembly's point of gravity, seen from the elevation axis of rotation, not being on the side of the coupling of the bar (see FIG. 8a). The bar is a pylon connected permanently with the solar assembly and a spring is positioned between the rotary pole and the solar assembly. This arrangement generates the pressure of the operating bolt against the profile sleeve, with the solar assembly's point of gravity being on the bar side. The sloped disk (70) performs one full rotation per year, and has teeth or drillings at the edge towards the surface which is not sloped and that is moved with a sliding appliance (90) by one tooth per day (see FIG. 8a), with this sliding appliance being driven with the help of the rotary pole (2). A slide (91) may be included with the appliance, which on the one hand actuates one time per work cycle (day) in contact with the toothing of the sloped disk (70) (see FIG. 8b). The slide, which may consist of a swivelling sleeve with a guide bolt which can be inserted and which is supported from inside by a pressure spring and is pressed against the support by a readjusting spring, locks into the toothing of the sloped disk shortly before reaching the solar assembly's final position and turning it along by one interval. The slide may be fastened stationary, so that support and readjusting spring are not required.

FIGS. 9a–e show the biaxial sun tracker most suitable for circular solar assemblies. The supporting plate (101) of the solar assembly is in this case connected with a stationary pole (102) through a universal joint (100) with (in central position) horizontal axes of rotation and performs a sort of rolling movement around the pole with the help of actuators.

Figure 9A:
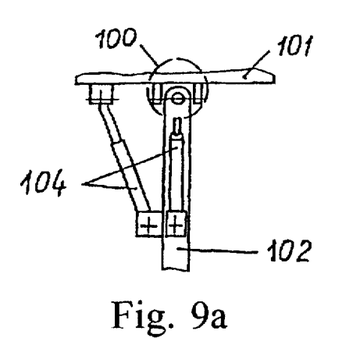
FIG. 9a is a view of a biaxial sun tracker with two cylinders, especially for circular sun trackers.
Figure 9B:
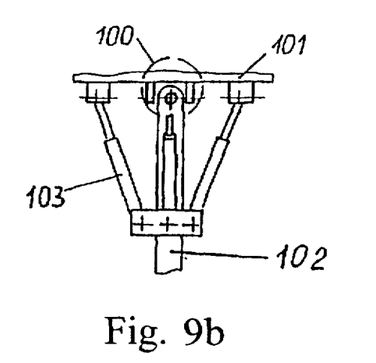
FIG. 9b is a view of a biaxial sun tracker with multiple cylinders, especially for circular sun trackers.
Figure 9C:
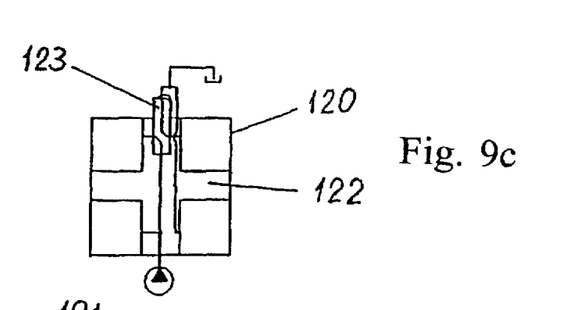
FIG. 9c is a view of a biaxial sun tracker with a thickly walled tube, especially for circular sun trackers.

FIG. 9a shows the sun tracker, driven by two cylinders (104) offset by 90° and coupled through joints with the supporting plate (101) of the solar assembly and the pole (102). FIG. 9b shows the sun tracker driven by several, at least four hinged twin cylinders, arranged mirror-symmetrically around the pole (102) (in relation to the central position). The work volume of a twin cylinder (for the twin cylinder's interior construction see FIG. 9d) is separated by a dividing piston (111) with a power transmission into two separately controlled cylinders (112) and (113). All cylinders are switched into two separately controlled cylinder groups (top (112) and lower (113) cylinder group), the azimuth tracker is thus realized by one cylinder group and the elevation tracker of the solar assembly by the other cylinder group.

Figure 9D:
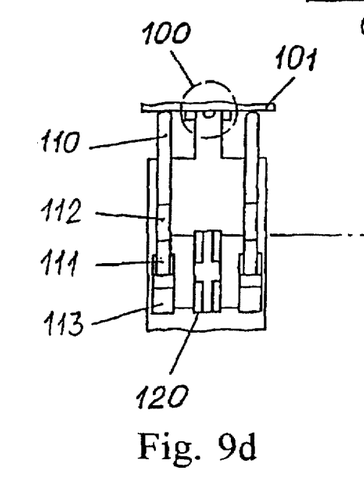
FIG. 9d is a view of the twin cylinders interior construction for an axial sun tracker.

The control of the two cylinder groups is realized by a circular slowly rotating diversion valve (120) in two separate diversion levels. In this case both diversion levels are divided into 2 semicircles each by a radial catch (121) in the diversion valve. The semicircles of the azimuth control are permanently connected with a pressure and/or outlet connection via ducts in the radial catch (121). The semicircles of the elevation control change the pressure and/or outlet connection in certain sun positions. This is achieved through a stationary element (123), which is shaped like a semiaxis and contains ducts and which is inserted axially into the diversion valve (120).

Figure 9E:
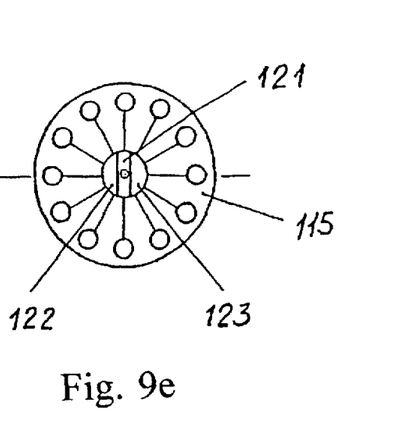
FIG. 9e is a view of a biaxial sun tracker with a face plate, especially for circular sun trackers.

In a different execution type, the twin cylinders are performed in a face plate (115) or in a thickly walled tube (see FIG. 9c) and they are arranged parallel-symmetrically in relation to the stationary axis of the universal joint (100). The solar assembly is driven by rams, which also serve as pistons of the twin cylinders and press against the supporting plate (101) of the solar assembly.

For trackers with horizontal universal joint in accordance with FIG. 9, the pressure energy accumulator can also be used. In this case all variants and constructive execution types of the pressure energy accumulator and the charging units, as described for the tracker with helical groove guide are applicable.

A different execution type, applied for tracking the lens sunlight concentrator, includes a rotatable mirror, which deflects the concentrated light ray to below, and is rotated by the diversion valve.

It is claimed:

1. Azimuthal sun tracker system working according to the gravitational force principle for a solar assembly with a rotary pole carrying the solar assembly being supported by a first chamber of variable volume including a single-acting regulating cylinder, and the fluid contained in the chamber being displaced from the chamber by the effect of the dead load force of the solar assembly and of said rotary pole, causing said rotary pole to sink and being tracked according to the course of the sun by interaction of a guide element, with a complementary guide groove, said rotary pole being supported on an additional power block, carrying the main part of the weight of the solar assembly and of said rotary pole, and said power block stores energy during the sinking of the solar assembly for reuse during lifting.

2. Tracker of claim 1 wherein the power block comprises a counterweight which is coupled with said rotary pole by one of a hydraulic balance, through a fluid transmission, and a mechanical balance, through a mechanical power transmission.

3. Tracker of claim 1 wherein the power block comprises one of a long stroke spring and a pressure accumulator, which is coupled with said rotary pole through a fluid transmission and which changes the pressure values insignificantly during the work cycle.

4. Tracker of claim 1 wherein the first chamber is connected with a pressure energy accumulator, through a control valve and one of an outlet and a feed line of the chamber, including a thermothrottle.

5. Tracker of claim 4 wherein said first chamber of variable volume comprises a regulating cylinder with a weight case of solid construction, forming a piston for the pressure energy accumulator, axially movable in a vertical cylindrical pipe, which contains a guidance for said rotary pole and is secured against torsion in relation to the vertical cylindrical pipe by a form-fit guidance.

6. Tracker of claim 5 wherein the piston of the regulating cylinder and the servo piston of the power block form a construction unit in form of a T-piston, with the lower portion of the T-piston and the servo piston being continuously subject to the pressure of the pressure energy accumulator through a drilling in the lower part of the weight case.

7. Azimuthal sun tracker system working according to the gravitational force principle for a solar assembly with a suspension pole carrying the solar assembly being supported by a chamber of variable volume including a single-acting regulating cylinder, the solar assembly being rotated about the horizontal axis during lifting or lowering of the suspension pole, by the effect of a hinged cross-bar connected with a supporting construction, with the sinking being caused by the dead load force of the solar assembly and of the suspension pole, the lifting being caused by connecting the chamber with a pressure source, said suspension pole being supported on an additional power block, carrying the main part of the weight of the solar assembly and of said suspension pole, and said power block stores energy during the sinking of the solar assembly for reuse during lifting.

8. Tracker of claim 7 wherein the power block comprises a counterweight which is coupled with said suspension pole by one of a hydraulic balance, through a fluid transmission, and a mechanical balance, through a mechanical power transmission.

9. Tracker of claim 7 wherein the power block comprises one of a long stroke spring and a pressure accumulator, which is coupled with said suspension pole through a fluid transmission and which changes the pressure values insignificantly during the work cycle.

10. Tracker of claim 7 wherein said chamber is connected with a pressure energy accumulator, through a control valve and one of an outlet and a feed line of the chamber, including a thermothrottle.

11. Rotational translatory radial bearing with guidance associated with a rotary pole of an azimuthal sun tracker system working according to the gravitational force principle for a solar assembly with a rotary pole carrying the solar assembly being supported by a first chamber of variable volume including a single-acting regulating cylinder, and the fluid contained in the chamber being displaced from the chamber by the effect of the dead load force of the solar assembly and of said rotary pole, causing said rotary pole to sink and being tracked according to the course of the sun by interaction of a guide element, with a complementary guide groove, said rotary pole being supported on an additional power block, carrying the main part of the weight of the solar assembly and of said rotary pole, and said power block stores energy during the sinking of the solar assembly for reuse during lifting; said bearing comprising:

an exterior sleeve with at least three helical ball races, with one of a plurality of bearing balls and slide bearings being allocated to the ball races and running on the surface of an interior sleeve and taking the radial loads, said bearing balls being similar to the balls of known radial ball bearings and said slide bearings being used with said helical ball races being constructed similar to that of a ball nut, with both sleeves containing each at least one helical guide groove, containing at least one guide ball, taking the tangential loads.

12. Bearing of claim 11 wherein said bearing has one of a first and second arrangement, said first arrangement having all guide grooves of the exterior sleeve being connected by ducts in the exterior cylinder to form a closed spiral line and thus form an infinite ball race for the guide balls and all bearing ball races of the exterior sleeve being connected by ducts in the exterior sleeve to form a closed spiral line and form an infinite ball race for the bearing balls, and said second arrangement having both bearing ball races and guide ball races of the exterior sleeve being connected by ducts in the exterior sleeve to form a closed spiral line and form an infinite ball race for balls, which depending on their actual position have the function of either bearing balls or guide balls.

13. Thermothrottle associated with a rotary pole and a solar assembly of an azimuthal sun tracker system working according to the gravitational force principle for a solar assembly with a rotary pole carrying the solar assembly being supported by a first chamber of variable volume including a single-acting regulating cylinder, and the fluid contained in the chamber being displaced from the chamber by the effect of the dead load force of the solar assembly and of said rotary pole, causing said rotary pole to sink and being tracked according to the course of the sun by interaction of a guide element, with a complementary guide groove, said rotary pole being supported on an additional power block, carrying the main part of the weight of the solar assembly and of the rotary pole, and said power block stores energy during the sinking of the solar assembly for reuse during lifting, said thermothrottle comprising:

a core body arranged in the flow space of a throttle case, with the coefficients of thermal expansion of the throttle case and of the core body differing considerably from each other and leading to a continuous change of the flow cross section geometry when one of the fluid and throttle temperature changes, whereby the thermothrottle's flow resistance changes continuously and in accordance with a regularity which is designed and predetermined through material selection and component geometry.

14. Thermothrottle of claim 13 further comprising one of:

a baffle plate having a fluid jet exerting from a nozzle vertically formed by a front face of a rod-shaped core body, with the fluid flowing through axially;

the core body and the throttle case forming a conic gap, with the fluid flowing through axially;

the core body and the throttle case forming a cylindrical gap, with the fluid flowing through axially; and the flow meeting the core body laterally and the alteration of the throttle resistance being performed through an expansion of the core body in longitudinal direction transversely to the flow direction;

with the core body being positioned by a radial spacer pin inserted in a deep radial drilling in the core body, serving as holding pin for the axial direction, and a form-fit fastening element axially fastening at the end of the core body.

15. Thermothrottle of claim 13 wherein the coefficient of thermal expansion of the core body is larger than that of the throttle case wherein an electrical heating element is disposed in the interior of the core body which causes, during heating, the expansion of the core body and an increase of the throttle resistance, and a portion of the core body surrounded by flow is wrapped in an electric heating sleeve, causing a temperature increase of the fluid and thus a reduction of the throttle resistance, with the heating sleeve and the core body being isolated from each other by a thermally insulating elastic layer.

16. Light detector comprising:

a lens installed in a top wall of a case, a plurality of solar elements disposed in a level $z_s$, with $z_s<f$ or $z_s \approx f$ and f being the focal distance of the lens, said solar elements being arranged in such way that an area free from solar elements is achieved in the center, whereby none of the solar elements are exposed in a predetermined, desired position.

17. Light Detector of claim 16 with each side of a case, with a number of sides of $n \geq 6$ each, being equipped with a lens at the center and a solar element carrier having a shape similar to that of the case being arranged centrally in the case, with each side of the solar element carrier being covered with solar elements and only one side being free from solar elements at its center, or none side being free from solar elements at its center.

18. Light Detector of claim 17 further comprising system components of the light detector which are designed in such way that the performance of the output signal is sufficient for activating control elements of a system, the light detector being connected directly through signal lines to said control elements without intermediary amplifier.

19. Light Detector of claim 17 wherein said light detector is used for the determination of the coordinates of light sources, all sides of the solar element carrier that are relevant for the light detector's operation are covered homogeneously with solar elements, and a solar element field is coupled with the coordinates of a light source through evaluation electronics in such way that the actual coordinates are determined from the exposed solar element group.

20. Light Detector of claim 16 further comprising system components of the light detector which are designed in such way that the performance of the output signal is sufficient for activating control elements of a system, the light detector being connected directly through signal lines to said control elements without intermediary amplifier.

21. Light Detector of claim 16 wherein said light detector is used for the determination of the coordinates of light sources, all sides of the solar element carrier that are relevant for the light detector's operation are covered homogeneously with solar elements, and a solar element field is coupled with the coordinates of a light source through evaluation electronics in such way that the actual coordinates are determined from the exposed solar element group.

* * * * *